US012700072B2

(12) United States Patent
Nijland

(10) Patent No.: US 12,700,072 B2
(45) Date of Patent: Aug. 4, 2026

(54) OPTIMIZING THE DISPLAYING OF HDR IMAGES

(71) Applicant: KONINKLIJKE PHILIPS N.V., Eindhoven (NL)

(72) Inventor: Rutger Nijland, Someren (NL)

(73) Assignee: Koninklijke Philips N.V., Eindhoven (NL)

( * ) Notice: Subject to any disclaimer, the term of this patent is extended or adjusted under 35 U.S.C. 154(b) by 246 days.

(21) Appl. No.: 18/711,962

(22) PCT Filed: Nov. 14, 2022

(86) PCT No.: PCT/EP2022/081695
§ 371 (c)(1),
(2) Date: May 21, 2024

(87) PCT Pub. No.: WO2023/094187
PCT Pub. Date: Jun. 1, 2023

(65) Prior Publication Data
US 2025/0014154 A1      Jan. 9, 2025

(30) Foreign Application Priority Data
Nov. 26, 2021      (EP) ..................................... 21210769

(51) Int. Cl.
*G06T 5/92* (2024.01)
*G06T 5/40* (2006.01)
*G06V 10/60* (2022.01)

(52) U.S. Cl.
CPC .................. *G06T 5/92* (2024.01); *G06T 5/40* (2013.01); *G06V 10/60* (2022.01)

(58) Field of Classification Search
CPC .............. G06T 5/92; G06T 5/40; G06V 10/60
See application file for complete search history.

(56) References Cited

U.S. PATENT DOCUMENTS 10,104,334 B2 *  10/2018  Evans ........................ G06T 5/90
10,176,561 B2 *  1/2019  Evans ........................ H04N 5/20
(Continued)

FOREIGN PATENT DOCUMENTS

EP             3621307 A1 *  3/2020  ........... H04N 19/162
WO      WO-2010015140 A1 *  2/2010  ............... G06T 5/40
(Continued)

OTHER PUBLICATIONS

Miao et al., 2019, "Image enhancement based on local luminance statistics and non-linear functions" (pp. 1-8) (Year: 2019).*
(Continued)

*Primary Examiner* — Manav Seth

(57)      ABSTRACT

1. To obtain in a pragmatic manner better watchable HDR images, we propose several variants of an image processing apparatus for processing an input image (Im_Comm) of an input video to obtain an output image of an output video, wherein the input image has pixels which have input luminances (Ln_in_pix) which fall within a first luminance dynamic range (DR_1), which first luminance dynamic range has a first maximum luminance (PL_V_HDR), wherein the output image has pixels which have output luminances which can be calculated from the input luminances and which fall within a second luminance dynamic range, which second luminance dynamic range has a second maximum luminance (PL_V_MDR), wherein the apparatus comprises a video data input (227) arranged to receive the input image and a reference luminance mapping function (F_L) which is encoded as metadata associated with the input image, wherein the reference luminance mapping function specifies a relationship between luminances of a first reference image and luminances of a second reference image, wherein the first reference image is the input image,
(Continued)

wherein the second reference image has a second reference maximum luminance (PL_V_SDR); wherein the apparatus comprises a display adaptation unit (209) arranged to determine an adapted luminance mapping function (FL_DA) which is based on the reference luminance mapping function (F_L), wherein the display adaptation unit uses a pre-fixed display adaptation algorithm, which specifies for each point on a diagonal, in a coordinate system of the input luminances normalized to a maximum being 1 and the output luminances normalized to a maximum being 1, a respective metric along a line segment oriented in a pre-fixed direction, the line segment starting on the diagonal, wherein the respective metric at each position is normalized by giving the point of intersection of the line segment and the locus of the luminance function (F_L) in the coordinate system the value 1, wherein the determining locates a position on each respective metric corresponding to the second maximum luminance (PL_V_MDR), wherein the collection of positions on the respective metrics is output as the adapted luminance mapping function (FL_DA); characterized in that the apparatus comprises a processing comprises a boost determination circuit (700) arranged to calculate a booster strength value (BO) comprising: —a histogram calculation unit (721) arranged to determine a histogram (hist) of intermediate luminances obtained by applying the adapted luminance mapping function (FL_DA) to the input luminances, —an average calculation circuit (705) arranged to calculate an average brightness measure (AB) on the basis of the histogram, —a first converter unit (706) arranged to calculate a first strength value (PosB) from the average brightness measure (AB), —a second measuring unit (711) arranged to calculate a weighted sum (BDE) of pixel counts in at least two configurable upper bins of the histogram, —a second conversion unit (712) arranged to calculate a second strength value (NegB) from the weighted sum (BDE), —wherein the boost determination circuit determines the booster strength value (BO) on the basis of a value (DV) which is equal to the first strength value (PosB) minus the second strength value (NegB); wherein the apparatus is further arranged to: use the display adaptation unit to calculate an adjusted adapted luminance mapping function (F_ALT_B), wherein the adjusted adapted luminance mapping function is calculated by using the display adaptation algorithm in a setting which outputs the locus of positions equal to the booster strength value on the metric as the adjusted adapted luminance mapping function (F_ALT_B); and the apparatus comprising a color transformer (208) arranged to apply the adjusted adapted luminance mapping function (F_ALT_B) to the input luminances to obtain the output luminances.

11 Claims, 9 Drawing Sheets

(56) References Cited

U.S. PATENT DOCUMENTS

| | | | | |
|---|---|---|---|---|
| 10,366,672 | B2 * | 7/2019 | Van Mourik | .......... H04N 19/85 |
| 10,878,776 | B2 * | 12/2020 | Van Mourik | ...... H04N 21/4358 |
| 11,769,235 | B2 * | 9/2023 | Tao | ........................... G06T 5/92 |
| | | | | 375/240.03 |
| 12,417,519 | B2 * | 9/2025 | Tao | ......................... H04N 19/00 |
| 12,559,663 | B2 * | 2/2026 | Engelke | ................. C09K 8/467 |
| 2014/0368531 | A1 | 12/2014 | Small | |
| 2016/0205405 | A1 * | 7/2016 | Ten | ...................... H04N 19/117 |
| | | | | 382/166 |
| 2025/0159364 | A1 * | 5/2025 | Douady | ............... H04N 1/4074 |

FOREIGN PATENT DOCUMENTS

| | | | | |
|---|---|---|---|---|
| WO | WO-2014118033 A1 * | 8/2014 | ............. G06T 7/136 |
| WO | 2016091406 A1 | 6/2016 | |
| WO | 2017157977 A1 | 9/2017 | |

OTHER PUBLICATIONS

International Search Report and Written Opinion from PCT/EP2022/081695 mailed Feb. 27, 2023.

* cited by examiner

OPTIMIZING THE DISPLAYING OF HDR IMAGES

CROSS-REFERENCE TO PRIOR APPLICATIONS

This application is the U.S. National Phase application under 35 U.S.C. § 371 of International Application No. PCT/EP2022/081695, filed on Nov. 14, 2022, which claims the benefit of EP Patent Application No. EP 21210769.2, filed on Nov. 26, 2021. These applications are hereby incorporated by reference herein.

FIELD OF THE INVENTION

The invention relates to methods and apparatuses for adapting the image pixel luminances of a High Dynamic Range video to obtain well looking images for a particular display.

BACKGROUND OF THE INVENTION

For the past decades, a standard manner of video capturing, coding and displaying (which we today call Low Dynamic Range (LDR) or Standard dynamic range (SDR)) has performed quite satisfactorily for bringing images of all kinds to end consumers (be it in television broadcast, video conferencing, gaming, etc.).

The system was based on defining relative brightnesses (0) % being the darkest black, and 100% the brightest white), with a luminance dynamic range of display output being typically between 100:1 and 1000:1. This system could work for well-lit (near uniformly lit) scenes, which therefore essentially capture the nature of the objects, namely their own lightness. i.e. the amount of light they reflect (+–4%-+–90%). For such scenes, such a capturing is similar to what a brain would expect and an eye would see.

From the creation side, a good image would result if one simply sets a value for the camera iris based on the average amount of light in the scene, and captures the lightnesses of objects based on the percentage of photo-electron filling each camera sensor pixel collects. For historical reasons, one doesn't communicate that signal itself (0 to 1 when normalized), but the square root of it. An analog standard like PAL would represent that signal as a voltage between 0) and 700 mV, and today's digital standards would quantize it to 255 levels, i.e. communicate the relative brightness of a pixel as a value between 0 and 255 inclusive.

There were however a few problems with this approach. Real world scenes are not lit in such a tightly controlled manner. Although there is in general still a bound on the ratio between the darkest and the brightest pixels (because a bright entity will inevitably illuminate the darker regions to some degree), there can be a significant dynamic range of luminances in the scene. E.g., the lighting level indoors will typically be 100 times less than outdoors, even with relatively large windows, making the dynamic range already 100 for the lighting ratio times 100 for the object reflectivity i.e. 10.000:1, and a small crack in a wall of a cave will give larger dynamic range.

Displays until recently didn't have the capability to display dynamic ranges far above 100:1, or peak brightnesses a.k.a. maximum luminances far above 100 nit anyway, so one typically clipped to maximum white (or darkest black) all the scene object luminances that couldn't be displayed well, when making the image (i.e. what would become displayed luminances).

However, a few years ago far better displays emerged. E.g. by putting a separately controllable LED behind a locus of LCD pixels, one could at least in theory make that area of the display as dark or bright as one desires, even though the LCD pixel has limits on how much of the light of the LED it can transmit. So nowadays one can make displays with a maximum luminance of 2000 nit or higher, and dynamic ranges of 10,000:1 or higher.

That would make possible a whole new manner of showing images (e.g. with a real visual impression of differently lit environments), if one takes care of making those images. It would however also necessitate new manners of coding images (so-called High dynamic range (HDR) images), describing HDR images, and handling HDR images, for starters since the legacy codec Rec. 709 is not even capable at all of coding the large range of to be coded luminances in the created images.

A few years ago, novel techniques of high dynamic range video coding were introduced, inter alia by applicant (see e.g. WO2017157977).

Coding of a video is concerned with making pixel color codes (e.g. a luma and two chromas per pixel) to represent the images. This is something different than knowing how to optimally display a HDR image. E.g., the simplest methods merely employ a highly non-linear Opto-Electrical transfer function OETF to convert desired luminances into e.g. 10 bit luma codes, and vice versa one can convert those video pixel luma codes into to be displayed luminances, by using an inversely shaped Electro-optical transfer function EOTF, mapping the e.g. 10 bit electrical luma codes to the to be displayed optical pixel luminances, but more complex systems can deviate in several directions, in particular by disconnecting the coding of an image, from a particular use of a coded image.

One new way of defining HDR images, is that one made them on a deployed dynamic range of a so-called target display (not to be confused with any actual display of an end customer). The maximum luminance PL_V of that target display would be co-communicated in metadata together with the image, and it would represent that the image was made for that range. Rather than loading a relative image straight from camera, one could now precisely define the needed luminances in some master HDR image.

So now one could precisely say how much brighter e.g. a fireball of an explosion should be compared to the surrounding pixel luminances of a room (in SDR one would typically changes the iris to expose for that fireball, i.e. so that much of its pixels would fall in the range 0-100%).

So a first video creator could make e.g. a 4000 nit PL_V video of this scene. Making a 4000 nit video, as contrasted with e.g. a 2000 nit PL_V video, would typically imply that somewhere in the video, i.e. for some time instant, one would make pixels which have luma codes approximately coding 4000 nit pixels (i.e. pixels to be ideally displayed, as far as the receiving display is capable, as 4000 nit). He could, knowing that he has a range up to 4000 nit available, and taking into account the impact of the fireball in the story, e.g. related to its size in amount of pixels or percentage of the image area covered, decide that the brightest pixel of the fireball should fall at 3000 nit, and reserve the 4000 nit for a laser beam later in the movie.

A maker of an equivalent 2000 nit version of the same movie, would when balancing all aspects (visual impact of the fireball, but also relationship to the luminance of the surrounding pixels, and capability of that 2000 nit target display), e.g. put the brightest point of the fireball at 1950 nit. This defines various flavors of input image, and any particular display, e.g. with (actual) display maximum luminance PL_D of 600 nit, would then still have to figure out how to map all the luminance values of the mage object pixels to its available dynamic range.

But this new manner of defining images opens a road to enabling a more predictable manner of displaying those images. A display that doesn't have a sufficient dynamic range would indeed need to do some luminance downgrading, but could do so in a manner respectful of the needs of the image, or more precisely of how the creator has defined those re-grading needs. In the SDR era one would just use a simple heuristic to display images: map the brightest pixel in the image (white, i.e. luma code 255) to the brightest displayable pixel. On a 200 nit PL_D display the image would then look 2× as bright as on a 100 nit display. With such a small ratio of the maximum luminance of displays, this may be acceptable to both viewers and creators (the one who purchased a brighter more expensive display just has a somewhat more beautiful image of the same scene, since eye and brain calibrate some of the difference away again).

But when having brighter HDR displays, e.g. with a PL_D of 1000 nit or higher, not only does showing white pixels of 1000 nit become too extreme, but more importantly, one could use the range of the display much better by using the new techniques of coding and handling HDR images, therefore showing real impressive HDR images.

With FIG. 1 we elucidate what exactly is a difference between HDR images (despite the higher value of PL_V), but also how one can handle (reduce) such difference when making an equivalent lower dynamic range image, e.g. 100 nit PL_V SDR image corresponding to the HDR master image.

Grading in this application is intended to mean either the activity, or the resultant image in which pixels have been given a luminance as desired, e.g. by a human color grader, or an automaton (e.g. the fireball is 5× brighter than the surrounding pixels, in the master image which was graded, not 4× or 6×). If one looks at an image, e.g. designs an image, there will be several image objects, and one may ideally want to give the pixels of those objects a luminance spread around an average luminance which is optimal for that object, given also the totality of the image, and the scene. E.g., if one has an image capability available so that the brightest codeable pixel of that image is 1000 nit (the image or video maximum luminance PL_V), one grader may elect to give the pixels of an explosion luminance values between 800 and 1000 nits, to make the explosion appear quite punchy, whereas another movie maker may elect an explosion no brighter than 500 nit, to e.g. not deter too much from the rest of the image at that moment in time (and of course technology should be able to handle both situations, so for both grader a target display dynamic range should be defined in a stable manner).

The maximum luminance of a HDR image or video (i.e. of its associated target display) may vary considerably, e.g. typical values may be e.g. 1000 nit, or 4000 nit, or even 10,000 nit, non-limited (typically one would say one has a HDR image when PL_V is at least 600 nit).

HDR displays may have a maximum capability, i.e. a highest displayable pixel luminance of (starting for the lower end HDR displays) e.g. 600 nit, or 1000 nit, or a number N times 1000 nits.

A video creator cannot typically make an optimal video for each possible end-user display (i.e. in which the capability of the end-user display is used optimally by the video, with the maximum luminance of the video never exceeding the maximum luminance of the end-consumer display, but also not being lower to make good use of the available dynamic range). I.e., one may implement a property similar to the SDR era "display maximum image brightness as maximum displayable brightness", but now this is not accidentally electronically implemented, but a mathematically precisely definable property (and one can select to give only one pixel the luminance 4000 nit, and grade all other scene objects at any desirable lower luminance value).

A secondary question then emerges, how to best display an image with a peak luminance PL_V on a display with a (oftentimes much) lower display peak luminance PL_D, which is called in this text display adaptation (or one can also call it display optimization). Specifically we will use the term for an adaptation which is not arbitrary, but as we will show below guided by information on the needed re-grading of the pixel lumas in the display optimization, which as will be explained below can in the simplest technical manner be done by the video creator making and communicating at least one luma mapping function. Even in the future, there will still be displays that require a lower dynamic range image than the e.g. 2000 nit PL_V image which was created. In theory a display can always re-grade i.e. map the luminances of the image pixels so that they become displayable by its own internal heuristics, but if the video creator takes good care in determining the pixel luminances, it may be beneficial that he can also indicate how his image should be display adapted to lower PL_D values, and ideally the display follows these technical desiderata to a large degree. If the display manufacturer re-grades the fireball according to its arbitrary display-internal algorithm, it may not look as impressive as originally intended by the creator.

However, there is some tension of who is in control in the display, i.e. who has the last say on how bright exactly all image objects should be displayed. One could say it should be the creator of the video, because he defines the look. However, the end user may also decide he doesn't like e.g. videos that come out as bright as they do. Lastly the display manufacturer may also want to have a say in the matter, e.g. not to be a slave of the creator, but to make his display pop out by making the video display slightly better than the competitor's. Defining such a possibility in the framework of the deployed new HDR coding and handling approach, at least guarantees that the video creator still has the technical possibility to have a say on the final look of the image, rather than that the display maker does an arbitrary processing fully ignorant on what the images were supposed to be, so that nobody has a good idea anymore of how the image will finally look on the various displays.

The steps involved in making and encoding a HDR image can be summarized as follows:

a) One has to define the desired absolute luminances of pixels (of the master HDR image, i.e. the first image to grade for a HDR scene), and for this one defines a dynamic range of a target display ending at PL_V (this can be called grading of the image)

b) One needs to encode these luminances as e.g. 10 bit lumas, since a typical video coding uses a YCbCr pixel color coding; this requires selecting one of various possible HDR electro-optical transfer functions (EOTF), which selection is typically also co-communicated as a metadatum of the target display.

This constitutes the basic making of a HDR image, per se. It can be reconstructed into a decoded HDR image at the receiving side, e.g. in a television display.

However, in a professional future-proof system, the video creator will add more metadata.

This would typically involve at least defining luma mapping functions (component c in addition to the above a and b), specifying how a secondary reference grading could be obtained from the master HDR image of e.g. 5000 nit PL_V, by applying a luminance mapping (which is typically defined as a luma mapping functions, those two being mathematically related if one knows the EOTF which defines the master HDR image and the EOTF which defines the lumas of the secondary image).

Advantageously one may want to make the second image an SDR image. Not only does one then guarantee that one knows which relative positions the luminances of all image objects should have on the most extreme gradings one would typically encounter i.e. need in practice, between which one can make other medium dynamic range gradings, but also if one used as image to be communicated as representative of the pair of gradings this SDR image, it can be used as a backwards compatible system in which legacy displays can directly display this received SDR image without needing any knowledge of HDR video coding or handling. We can define this SDR image to have a PL_V_SDR=100 nit, but classically it will be interpreted as a dimensionless image, with 100% being SDR white.

To elucidate component a of the approach, the reader can look at a few image objects of some typical HDR images in FIG. 1.

On the left side luminance axis are the luminances of the master HDR image, i.e. the "best image" the creator makes and would ideally like to see displayed.

E.g., for the outdoors wester scene ImSCN1, he would like to make good use of the increased dynamic range, to render scorching objects under the sun. He may consider a maximum for those objects (e.g. the white hat of the cowboy) of 500 nit to be satisfactorily (the viewer will then experience the sun-baked scene because it appears 5× brighter than a normal LDR rendering, which might be e.g. a previous shot of the movie happening indoors). Of course on the SDR luminance range on the right, which has a much smaller secondary luminance dynamic range DR_2 than the primary dynamic range DR_1, one must map the luminance of the cowboy hat at some convenient position between 0.1 nit and 100 nit, say to the 18 nit. The collection of all these projection arrows defines a luminance-to-luminance mapping function to define the SDR image on the basis of the HDR image (or SDR-to-HDR if the functions are invertible, i.e. with e.g. no clipping of HDR luminances to the same SDR luminance). The same can be done for the nighttime scene ImSCN2, or the cave with an opening through which one can see the sunlit outside world ImSCN3.

If one now wants to make a medium dynamic range image (MDR), e.g. with a PL_V_MDR of 800 nit, e.g. ready to drive a 800 nit PL_D display, the question is where the various object luminances should end up. This can be a complex question, as depending on which objects are in which kind of scene, one may want to put any specific object like the cowboy at various possible positions according to the video creator (see arrow FL_DA), because on such a dynamic range one may consider the re-distribution of the various object lumaninances differently depending on inter alia the extent of the available tertiary dynamic range DR_3 and how much it deviates from the primary DR_1, but also on the type of image content (a plain type object like the cowboy may have different needs than e.g. an explosion, or clouds in the sky, etc.).

But we can assume that one may be able to use, in pragmatic not theoretically perfect systems, a predesigned method which links the three positions by some fixed algorithm, which has symbolically been shown by simply continuing the line, and finding the interesting position on the tertiary luminance axis. Where the display adaptation from the primary HDR image (a.k.a. master image) to the secondary grading will simply involve applying the luma mapping function which was specified for this re-grading by the color grader or automatic grading algorithm (which will define an averagely good mapping based on analyzing various characteristics of the master HDR image, such as e.g. its luma histogram, etc.), we will use display adaptation to obtain a tertiary (MDR) image on the basis of this luma mapping function and some pre-deployed display adaptation algorithm, which display adaptation algorithm will convert the initial e.g. HDR-to-SDR luma mapping function into a HDR-to-MDR luma mapping function (see elucidation below, with FIGS. 4 and 5).

Regarding component b, A simple HDR codec was introduced to the market, the HDR10 codec. This HDR10 video codec uses as OETF (inverse EOTF) the so-called Perceptual Quantizer (PQ) function which is standardized in SMPTE 2084. Instead of being limited to 1000:1 like the Rec. 709 OETF, this PQ OETF allows defining (typically 10 bit) lumas for many more (to be displayed to the extent possible) luminances, namely between $1/10,000$ nit and 10,000 nit, sufficient for any practical HDR video production.

Note that the reader should not simplistically confuse HDR with a large amount of bits in the luma code words. That may be true for linear systems like the amount of bits of an analog-digital convertor, wherein indeed the amount of bits follows as the logarithm with base 2 of the dynamic range. However, since code allocation functions can have a quite non-linear shape, in theory however one desires, one can define HDR images with only 10 bit lumas (and even 8 bit per color component HDR images), which led to the advantage of reusability of already deployed systems (e.g. ICs may have a certain bit-depth, or video cables, etc.).

After the calculation of the lumas, one has a 10 bit plane of pixel lumas Y_code, to which two chrominance components Cb and Cr per pixel are added, as chrominance pixel planes. This image can be classically treated further down the line "as if" it was an SDR image technically, e.g. MPEG-HEVC compressed, etc. The video compressor doesn't really need to care about the pixel colors or luminances. However the colorimetry of the HDR PQ-defined image will of course not yield the correct colors as defined under Rec. 709 colorimetry, hence further luminance or tone mapping may be in order.

So the receiving apparatus e.g. a display (or in fact its decoder) typically needs to do the correct color interpretation of the {Y,Cb,Cr} pixel colors, to display a correctly looking image, and not an image which has e.g. bleached colors.

This is typically handled by—in addition to the pixel color component matrices of the video images—co-communicating further image definition metadata, which defines the image coding, such as an indication which EOTF is used, for which we shall assume presently without limitation that the PQ EOTF (or OETF) was used, and a value of the maximum luminance of the target display associated with the HDR image PL_V, etc.

More sophisticated future-proof HDR codecs may include further image definition metadata, e.g. handling metadata, e.g. a function specifying how to map (or in other wording re-grade) normalized luminances of a first image up to PL_V=1000 nit, to normalized luminances of a secondary reference image, e.g. a PL_V=100 nit SDR reference image (as we elucidate in more detail with FIG. 2). These mapping functions may change per image, since a shot of a cave would need a different luminance remapping to SDR luminances than e.g. a shot of a sun-bleached desert, i.e. one may associate a separate global luminance mapping function F_L (or equivalently embodied as a luma mapping function, via the EOTF of input and output luma) in metadata associated with each successive image of the video.

FIG. 2 shows a total HDR video communication system. It may use HDR video image coding as e.g. described in the standard ETSI TS 103 433 (High-Performance Single Layer High Dynamic Range System for use in Consumer Electronics devices (SL-HDR)), no limitations intended. At the transmission side, there is a source of images 201. Depending on whether one has offline created video, e.g. from an internet-delivery company, or real-life broadcast, this may be anything ranging from a hard disk to a cable output from e.g. a television studio, etc.

According to some video production rules a master HDR video (MAST_HDR) results, e.g. color graded by the human color grader, or a shaded version of a camera capturing, or by means of an automatic luminance re-distribution algorithm, etc.

This will be e.g. a 5000 nit PL_V video as shown on the left side of FIG. 1, e.g. the Western movie with the bright 5000 nit sun.

From this master HDR image, a communication image is derived for actually communicating the HDR image. This can be done in various manners. E.g. one can transmit the 5000 nit HDR image itself, by calculating 10 bit luma codes with the PQ EOTF. We elucidate how one can also communicate another grading as proxy for the master HDR grading. E.g. we communicate an SDR re-graded version of the master HDR image, SDR communication image Im_SDR. If one uses a strictly increasing luminance or luma mapping function F_L, it will be invertible, and therefore in any receiver the HDR master image can be reconstructed by applying the inverse function to the Im_SDR pixel lumas. In general, taking into account that one may also want to do e.g. saturation change, there will be color mapping functions F_ct, which can be optimized per image. The color processing of the mapping is performed by color transformer 202.

Since the communication image essentially just looks like any other 10 bit image, and especially the SDR communication image Im_SDR is a real SDR image (in the sense that when it is directly without further color optimization displayed on a legacy LDR display it will give a good looking picture), this image can be compressed in video compressor 203, which will apply e.g. an MPEG algorithm like HEVC or VVC, or some other video codec like AV1 etc. to obtain a compressed HDR image Im_COD, depending on which compression formats have been deployed on any communication medium 205 (whether that be an optical disk, an internet subscription, digital terrestrial television, or some professional video communication system e.g. for monitoring or security, etc.). A formatter 204 may apply formatting as is typical for the communication, such as e.g. packetization, frequency modulation, (handshaking), etc. The mapping functions—which can be defined in various forms like parameters configuring function shapes, or exact specification of a function as e.g. a LUT, etc.—can easily be communicated as there are existing mechanisms to communicate various forms of proprietary data: one merely needs to agree in some video communication standard that a certain e.g. Supplemental Enhancement Information (SEI) message (SEI(F_ct)) contains a luma mapping function defined in a specific manner, and then each compliant receiver knows how to understand that SEI message.

So the reader again sees similar to the explanation using FIG. 1 the two components of a future-proof HDR coding: the first technical circuit or processing involves the colorimetric specification of the image as desired (the master image and the communication image to be more precise), and the second circuit or processing involves coding aspects per se, in particular to yield an image that is at least formally (not necessarily colorimetrically) compliant with existing communication technologies, so that one can send the HDR images over an existing communication channel with particular defined coding approach, conditions like available bandwidth, etc.

At any receiving site, a corresponding video signal unformatter 206 applies the necessary unformatting methods to re-obtain the compressed video as a set of e.g. compressed HEVC images (i.e. HEVC image data), e.g. demodulation etc.

Video decompressor 207 does the e.g. HEVC de-compression, to obtain a stream of pixelated uncompressed images Im_USDR, which in the present example are SDR images, but in another mode would be HDR images. A video data input 227 may be any suitable medium for communicating video pixel data and metadata. E.g. it may be an external cable like HDMI, and internal data bus in an apparatus, a connection to a network, etc. The video decompressor will also unpack the necessary luminance mapping function F_L from the e.g. SEI messages, or in general color transformation functions F_ct.

The images and functions are input to a (decoder) color transformer 208 which is arranged to transform the SDR image to an image of any non-SDR dynamic range (i.e. of PL_V higher than 100 nit, and typically at least a few times higher, e.g. 5×).

E.g. the receiver decoder can perform a simply reconstruction of the master 5000 nit image, by calculating from the Im_USDR a reconstructed HDR image Im_RHDR, by applying the inverse color transformations IF_ct of the color transformations F_ct used at the encoding side to make the Im_LDR from the MAST_HDR.

This image can then be sent e.g. to a display 210 for further display adaptation, to obtain e.g. a 700 nit PL_V image for optimally driving a connected 700 nit PL_D end user display, but the making of a display adapted image Im_DA_MDR can also happen in one go, during the decoding, by using in the color transformer a calculated FL_DA function (determined in an offline loop, e.g. in firmware) instead of the F_L function. In such an embodiment the color transformer may also comprise a display adaptation unit 209, to derive the FL_DA function based on the received F_L function, using a pre-baked (or configured) display adaptation algorithm.

The optimized e.g. 700 nit display adapted image Im_DA_MDR may be sent e.g. to a display 210 if the video decoder 220 is comprised e.g. in a settopbox or computer etc., or it may be sent to a display panel in case the decoder resides in e.g. a mobile phone, or it may be communicated to a movie theatre projector if the decoder resides in e.g. some internet-connected server, etc.

FIG. 3 shows for further elucidation a more detailed useful variant of internal processing of a color transformer 300 of a HDR decoder (or encoder, which may largely have the same topology typically, but using inverse functions, but typically not comprising the display adaptation, shown dashed in FIG. 3 as circuit 350), i.e. corresponding to FIG. 2, 208.

The luminance of a pixel, in this example an SDR image pixel, is inputted as a corresponding luma Y'SDR (we will elucidate the alternative inverse re-grading to lower dynamic range with further figures). The chrominance a.k.a. chroma components Cb and Cr are inputted into the lower processing path of color transformer 300.

The lumas Y'SDR are mapped to needed output luminances L'_HDR—e.g. master HDR reconstruction luminances, or some other HDR image luminances—by luminance mapping circuit 310. It applies the suitable function, e.g. the display adapted luminance mapping function FL_DA(t) for a particular image and e.g. a maximum display luminance PL_D, as obtained from the display adaptation function calculator 350 which uses as input the metadata-co-communicated reference luminance mapping function F_L(t). The upper processing track (circuit 310, which by itself may in embodiments consist of several successive sub-processings, but for elucidation of the present technical contributions to the field one can assume circuit 310 to apply a single luma mapping function for all pixels of a currently being transformed video image.

The display adaptation function calculator 350 may also determine a suitable function for processing the chrominances. For the moment we will just assume that a set of multiplication factors mC[Y] for each possible input image pixel luma Y (i.e. e.g. 0-1023) is stored in e.g. a color LUT 301. The exact nature of chromatic processing may vary. E.g., one may want to keep pixel saturation constant, by first normalizing the chrominances by the input lumas (corresponding hyperbolic curve in the color LUT), and then correcting for the output lumas, but any differential saturation processing may be used also. The hue will typically be maintained because both chrominances are multiplied by the same multiplier.

When indexing the color LUT 301 with the luma value of the currently being color transformed (luminance mapped) pixel, Y, the needed multiplicative factor mC results as LUT output. This multiplicative factor mC is used by multiplier 302, to multiply it by the two chrominance values of the present pixel, i.e. to yield color transformed output chominances $$Cbo = mC * Cb,$$

$$Cro = mC * Cr$$

[Eqs. 1]

Via a fixed color matrixing processor 303, applying standard colorimetry calculations, the chrominances can be converted into brightness-lacking normalized non-linear R'G'B' coordinates R'/L', G'/L' and B'/L'.

The R'G'B' coordinates giving the appropriate luminance for the output image are obtained by multiplier 311, which calculates:

$$R'\_HDR = (R'/L') * L'\_HDR,$$

$$G'\_HDR = (G'/L') * L'\_HDR,$$

$$B'\_HDR = (B'/L') * L'\_HDR,$$

[Eqs. 2]

which can be summarized in the color triplet R'G'B'_HDR.

Lastly, there may be a further mapping to a format needed for a display, by display mapping circuit 320. This yields display driving colors D_C, which not only may be formulated in a colorimetry desired by a display (e.g. even HLG OEFT format), but also this display mapping circuit 320 may in some variants be arranged to do some particular color processing for the display, i.e. it may e.g. further re-map some of the pixel luminances.

Some examples elucidating some suitable display adaptation algorithms to derive a corresponding FL_DA function for any possible F_L function that the creation side grader may have determined, are taught in WO2016/091406 or ETSI TS 103 433-2 V1.1.1 (2018 January).

The display adaptation approach is summarized in FIG. 4, by showing its action on a plot of possible normalized input luminances Ln_in, versus normalized output luminances Ln_out (these will be converted to actual luminances by multiplication by the maximum luminance of the display associated with the normalized luminances, i.e. a PL_V value). Note that such plots can be made as luma-luma plots, and a perceptually uniformized luma may be advantageous. E.g., the following equation of the present applicant may be used to derive such perceptually uniformized lumas:

$$Y\_P = v(L\_in; PL\_V\_in) =$$ [Eqs. 3]

$$\log[1 + (RHO - 1) * \text{power}(L\_in; \; p)]/\log[RHO],$$

in which $RHO$ is a constant which depends of an input maximum luminance PL_V_in, by the equation $RHO(PL\_V\_in) = 1 + 32 * \text{power}((PL\_V\_in/10,000);$ $p)$, $p$ being a constant typically being set equal to 2.4.

The input luminances L_in will be taken the normalized luminances of FIG. 4 when converting the horizontal axis to perceptual lumas, and the PL_V_in will be the PL_V for those luminances, i.e. e.g. 5000 nit if we were converting a 5000 nit PL_V master HDR image to the secondary reference grading. If the secondary reference grading, of which perceptually uniformized lumas between 0 and 1 are required on the vertical axis is an 100 nit SDR image, one will use the value PL_V_in =100 when using Eqs. 3 for calculating uniformized output lumas. The advantage of such an equation is that both axis are already appropriately uniformized, approximately as an eye would like to see different grey values for each respective range, which makes the mapping functions visually more relevantly defined.

Such display adaptation algorithm, i.e. the algorithm for calculating a final luma mapping on the basis of an input luma mapping from typically the video creator, to be applied to the lumas of an input image to obtain final display adapted lumas of a e.g. 700 nit MDR image, typically has the following technical characteristics.

One can contrast the input luma mapping function F_L with an identity transform. This identity transform corresponds to mapping the input image to itself: i.e. on the horizontal input axis on will have e.g. perceptually uniformized lumas for a 5000 nit span of luminances (i.e. PL_V_in =5000), and on the vertical axis one will have exactly the same scaled and divided set of perceptualized lumas. And the identity transform means that no brightening or darkening should occur for a pixel, so an input value on the horizontal axis of e.g. 0.6 for a particular pixel will map to exactly the same value 0.6 on the vertical axis. And this identity transform will therefore geometrically fall on the location of the 45 degree diagonal in the perceptually uniformized luma plot. It makes sense that mapping to some intermediate grading of an intermediate PL_V, scales the function. So the 5000-to-700 nit display adapted luma mapping function (FL_DA) has the same shape typically as the 5000-to-100 nit input function (FL), i.e. has the same bumps, but lies closer to the diagonal.

This "opening up" of a "fan of functions" can be formally formulated as follows:

a) One defines a direction for positioning the location of the intermediate points of any display adapted luma mapping function to be calculated, i.e. any point (pos) will fall on a line segment along that direction, with the point on the diagonal, corresponding to the input image luma, and the point on the function F_L, corresponding to the secondary grading, in this example an SDR grading, forming the end points of the line segment.

b) One defines a metric for locating on that line segment any PL_V value of a to be calculated intermediate image (i.e. the display adapted image for e.g. a 700 nit display, having a PL_V equal to 700 nit), in between the end points corresponding to the PL_V values of the two starting reference gradings (one of them being the communicated and received image, in this example the master HDR image with a PL_V of e.g. 5000 nit, corresponding to the diagonal identity mapping, and the other one being the secondary grading that can be calculated by applying the as metadata received luma mapping function to the primary/master HDR image lumas, having a value of e.g. PL_V=100 nit). In some embodiments the direction may be 135 degrees counterclockwise from the horizontal axis of input lumas, and in other embodiments it may be 90 degrees counterclockwise, and there may be display adaptation algorithms that use a first direction for calculating a first partial luma mapping function, and a second direction for a second partial function.

E.g. the video creator has designed a luminance mapping strategy between the two reference gradings as explained with FIG. 1. Ergo, for any possible normalized luminance of a pixel in the input image, Ln_in, say e.g. the master HDR image, this normalized input luminance must be mapped to a normalized output luminance Ln_out, of the second reference grading being the output image. This re-grading of all luminances corresponds to some function F_L, which can have many different shapes as determined by the human grader or grading automaton, and the shape of this function is co-communicated as dynamic metadata.

The question is now, what shape should a derived secondary version of the F_L function being the display adapted mapping function FL_DA have, in this simple display adaptation protocol, to map input image lumas to MDR image lumas E.g., on a metric, one can calculate that a e.g. 800 nit display should have 50% of the grading effect, the full 100% being the re-grading of the master HDR image to the 100 nit PL_V SDR image. In general, one can via a metric determine any point between no re-grading at all and full re-grading to the second reference image, and this for any possible normalized input luminance of a pixel (Ln_in_pix). The resultant MDR luminance (or luma) is denoted as display-adapted luminance L_P_n, the location of which depends of course on the input normalized luminance, but also a value of the maximum luminance associated with the to be calculated display adapted output image (PL_V_out). The skilled person understand that whereas one can represent the function in a normalized luminance representation, one can equivalently represent it in any normalized luma representation, defined according to any OETF.

The metric will advantageously typically be logarithmic in nature, which means that instead of values between e.g.

100 and 1000 nits being equidistantly spread on the line segment per 100 nit, the values are first converted by a non-linear function before allocating them to equidistant positions. E.g., one can decide that a 950 nit display is close enough to a PL_D=1000 nit value, so that a PL_V=1000 nit input image needs hardly any luminance mapping, whereas a 150 nit image may relatively need more change in the mapping compared to a 1000-to-100 nit mapping. Typically the creator of a coding ecosystem, or at least the creator of a receiving apparatus like a television display, will elect fixed values for all the choices, e.g., he will use a 90 degree orientation with a metric $pos = 1 - \{\log(1 + [(PL\_V - 100)]) / \log(1 + [(1000 - 100)])\}$. [Eq. 4]

We can determine the corresponding display adapted luminance mapping FL_DA as follows (see FIG. 4). Take any one of all input luminances, e.g. Ln_in_pix. This corresponds to a starting position on the diagonal having equal angles to the input and output axis of normalized luminances (shown as the square). Place for each position along the diagonal a scaled version (scaled metric SM) of the metric at each point on the diagonal, so that it lies orthogonal to the diagonal (or 135 degrees from the input axis counterclockwise), starts at the diagonal, and ends—with its 100% level or normalized pos=1—at a point on the F_L curve, i.e. at the intersection of the F_L curve with the orthogonal scaled metric SM (shown by the pentagon). Place a point at the (in the example, for this PL_D value of a display for which an image must be calculated) 50% level of the metric, i.e. halfway, or in general any normalized position as obtained by evaluating Eq. 4, or any similar non-linear equation for defining the needed severity of re-grading for any deviation between PL_D and PL_Vin. By doing this for all points on the diagonal, corresponding to all Ln_in values, one obtains the FL_DA curve, and it is similarly shaped as the original, i.e. does the same re-grading, but maximum-luminance-re-scaled/adjusted, i.e. in a suitably lesser manner. This function is now ready to apply for calculating the needed corresponding optimally re-graded/display adapted 700 nit PL_V pixel luminances given any input HDR luminance value of Ln_in. This function FL_DA will be applied by luminance mapping circuit 310, after receiving this display adapted luma mapping function right before starting the colorimetric transformation on all running pixels of the currently processed video image.

FIG. 5 shows the technical components of display adaptation in general formally.

Display adaptation circuit 510, e.g. in a television, or settopbox, etc., may contain a configuration processor 511. It sets the values for processing of an image, before the running pixel colors of that image come in to be processed. E.g., the maximum luminance value of the display-optimized output image PL_V_out, may be set in the settopbox once by polling it from a connected display (i.e. the display communicates its maximum displayable luminance PL_D to the settopbox), or when the circuit resides in a television this may be configured by the manufacturer, etc.

The luminance mapping function FL may in some embodiments vary per incoming image (in other variants it may be fixed for a multitude of images), and is input from some source of metadata information 512 (e.g. this may be broadcasted as SEI messages, read from a sector of a memory like a blu-ray disk, etc.). This data establishes the normalized heights of the normalized metrics (Sm1, Sm2, etc), on which desired positions for the PL_D value can be found from the mathematical equation of the metric.

When an input image 513 is input, successive pixel luminances (e.g. Ln_in_pix_33 and Ln_in_pix_34; or lumas) run through the color processing pipeline which applies the display adaptation, and corresponding output luminances result, such as Ln_out_pix_33.

Pre-establishing such a fixed well-working function deviation algorithm as the display adaptation algorithm above, has the advantage of technical simplicity (i.e. little human grader input is needed if there are no control parameters for e.g. changing the equation of the metric for different positions along the diagonal), whilst establishing a stable re-grading so that the grader can predict what will similarly be displayed on various end-user displays various consumers may have. In fact, it is guaranteed, because the display adaptation algorithm works based in the input F_L function, in a manner so as to maintain its particular shape, which contains the needs of brightness re-grading of various objects in the image, that his graded look of the master image will indeed largely show on displays which are not sufficiently capable of displaying all luminances of the master HDR image. A disadvantage of a fixed algorithm is of course that it may not always yield images that are 100% perfect, according to any particular taste, so one may wish to improve on it.

So this deployed technology allows video creators to define a video of HDR images, and in addition specify how these video images should be automatically re-graded for various displays with different dynamic range, and he can tune the shape of the luma mapping function specifically to the needs of any particular image, i.e. the distribution of input respectively output lumas along the luminance dynamic range for all image objects. However, according to the inventor a problem is that this approach is still rather crude, and, although then potentially departing a little from the creator's graded look, in particular it may be advantageous if in or on top of this framework, display manufacturers and/or end viewers can also implement some amount of re-grading.

US20140368531 teaches an algorithm for boosting the transmissiveness of an LCD panel in case relatively dark images are to be shown, so that the backlight can be dimmed to save on energy which would otherwise be wasted by the closed pixels. Instead of doing this via voltage control, it teaches that the same can be done as an image processing operation changing the pixel luma codes to higher values, and use the standard LDR display power function of gamma 2.2. A boosted transmissivity function can be defined as desired which primarily boosts the darkest colors to become brighter, and the brighter colors are left largely unchanged. E.g., for the darkest colors a maximum boost can be applied of a factor 4 (the slope of the curve at zero). One would use such a strong boost for dark images but not so much for bright ones. One can realize the boost quickly by interpolating between the maximum boost and the minimum boost (which would be no boost, i.e. for bright images the image is left as is). I.e. one can then quickly interpolate the needed (intermediate) output for each pixel luma code, e.g. 166, as the interpolation of two corresponding output values. The amount of interpolation, e.g. 25%, depends on the analysis of the input image histogram (e.g. how many pixels are in the darkest of 8 bins).

SUMMARY OF THE INVENTION

A visually better looking image can be obtained by method of processing an input image (Im_Comm) of an input video to obtain an output image of an output video, wherein the input image has pixels which have input luminances (Ln_in_pix) which fall within a first luminance dynamic range (DR_1), which first luminance dynamic range has a first maximum luminance (PL_V_HDR), wherein the output image has pixels which have output luminances which can be calculated from the input luminances and which fall within a second luminance dynamic range, which second luminance dynamic range has a second maximum luminance (PL_V_MDR), wherein a reference luminance mapping function (FL) is received as metadata associated with the input image, wherein the reference luminance mapping function specifies a relationship between luminances of a first reference image and luminances of a second reference image, wherein the first reference image is the input image, wherein the second reference image has a second reference maximum luminance (PL_V_SDR);

wherein the processing comprises determining an adapted luminance mapping function (FL_DA) which is based on the reference luminance mapping function (FL), wherein the determining uses a pre-fixed display adaptation algorithm, which specifies for each point on a diagonal, in a coordinate system of the input luminances normalized to a maximum being 1 and the output luminances normalized to a maximum being 1, a respective metric along a line segment oriented in a pre-fixed direction, the line segment starting on the diagonal, wherein the respective metric at each position is normalized by giving the point of intersection of the line segment and the locus of the luminance function (FL) in the coordinate system the value 1, wherein the determining locates a position on each respective metric corresponding to the second maximum luminance (PL_V_MDR), wherein the collection of positions on the respective metrics is output as the adapted luminance mapping function (FL_DA);

characterized in that the processing comprises calculating a booster strength value (BO) comprising:

determining a histogram (hist) of intermediate luminances obtained by applying the adapted luminance mapping function (FL_DA) to the input luminances calculating an average brightness measure (AB) on the basis of the histogram, calculating a first strength value (PosB) from the average brightness measure (AB), calculating a weighted sum (BDE) of pixel counts in at least two configurable upper bins of the histogram, calculating a second strength value (NegB) from the weighted sum (BDE), determining the booster strength value (BO) on the basis of a value (DV) which is equal to the first strength value (PosB) minus the second strength value (NegB);

calculating an adjusted adapted luminance mapping function (F_ALT_B), wherein the adjusted adapted luminance mapping function is calculated by using the display adaptation algorithm in a setting which outputs the locus of positions equal to the booster strength value on the metric as the adjusted adapted luminance mapping function (F_ALT_B); and applying the adjusted adapted luminance mapping function (F_ALT_B) on the input luminances to obtain the output luminances.

Note that where we see luminances, we mean the representation of the technical concept of luminances. This means the reader should not read it limited to any specific representation, in particular the normalized physical luminances, but typically the luminances will be represented in a luma representation. E.g., an embodiment which works with a system of psychovisually uniformized lumas according to Eqs. 3 works well, but other representations will work too, if one sets the various elements correctly (e.g. metric scale).

Once the metric equation is defined, any PL_V_MDR value will fall by calculating the equation at some location of the metric between 0 and 1, which are, depending on which input image comes in and whether up- or downgrading is involved, the values PL_V_HDR (e.g. 5000 nit) and PL_V_SDR (100 nit) typically. Whereas we elucidate with one function F_L, several functions may be used in concatenation to transform one image (the interested reader may find useful embodiments in ETSI TS 103 433, which is incorporated by reference). The display adaptation algorithm will typically be set fixed once, per video communication ecosystem. E.g., for terrestrial ATSC broadcasting, the standard may elect an algorithm. An over the top supplier of movies from an internet server may use the same display adaptation algorithm, or elect to use a similar but different one. For any PL_V mastering of the HDR images, the second reference image is usually an 100 nit SDR image, because that has a good re-distribution of the image object lumas for most typically occurring low quality displaying systems. The PosB and PosN values are an easy manner to show the needs and dangers of increasing the re-grading as was intended in a competitive manner. Reusing the prefixed display adaptation algorithm assures predictability, and a large retainment of the original content grader's artistic intent for the images. Several parameters can be available, e.g. to shape the conversion functions, so that endpoint entities, e.g. a display manufacturer can tailor the system to his desiderate (e.g. more aggressively change the intended grading, but boosting some desirable picture aspects, e.g. from the strength of compressive downgrading).

We can see schematically in FIG. 6 (in an exaggerated manner) what can be done to at least some of the images of some videos. Suppose we map an input HDR image with PL_V=1000 nit, to standard 100 nit (or may be 200 nit) output. The diagonal represents then in normalized luminance coordinates what native linear scaling (e.g. according to the classical SDR display paradigm "map the brightest pixel coded in the image to the brightest displayable color (display white)") would introduce as darkening. All colors would be dimmed by a factor 10 compared to what they are supposed to be. That would not be problematic (or even a quite handy automatic tone mapping) for objects that are quite bright already, like a sunlit cloud, or our strongly lit cowboy. E.g. a pixel that originally is supposed to be 500 nit, will turn out displayed at 50 nit. This is on the one hand a reasonable value in the more limited dynamic range of an SDR display, but on the other hand nicely bright even in SDR, and therefore well-watchable. More problematic are the relatively darker objects. In input range R_i, the grader of the master 1000 nit HDR image will have carefully graded the darker objects, also taking care of the fact that there will be contrasting brighter HDR objects. Those would be e.g. indoors objects, and particularly critical may be the indoors objects in less well lit areas of the scene. In the real world (i.e. if one takes a luminance meter and starts measuring), the indoors objects are typically 100× darker than outdoors objects, as seen e.g. through a window in the image view. In a master HDR grading ending at PL_V=1000 nit, one will not typically use a ratio of 100:1, as on the one hand that doesn't make the best use of that dynamic range, and on the other hand is not what a typical viewer would expect to see (watching not the real scene, but a small rectangle during evening viewing in his living room). So one may use a lighting ratio 10:1 in the master grading, e.g. giving the outside pixels seen through the window values between 10 and 1000 nit, and the indoors pixels values between 0 and 100 nit.

That would look pretty nice when indeed shown on a 1000 nit HDR display. However, when scaling by a factor 10, a pixel which is supposed to be displayed at 10 nit, will get displayed at 1 nit, which is a deep black. Given there may be also influence of surround illumination at the viewing site, like reflections on the front glass of the display, these darker areas may become barely watchable.

This is why the grader, in combination with the display adaptation algorithm, creates the luminance (or luma) mapping function FL_DA, which will give a quite good re-mapping of all pixel luminances, e.g. in particular for the mentioned indoors scene those dark indoors pixels. We see indeed that the mapping curve stretches the input range R_i relatively to an output range R_o, which must still be converted to absolute luminances by multiplying by 100. But in any case, one uses in the example almost 50% of the available range, so that would guarantee better visibility.

However, in some situations one may want to apply an even stronger brightening re-grading, stretching the darkest luminances in this example over and ever larger second output range R_o2. This to the extent it is wise.

It is important to build this possibility on top of the existing re-grading framework. Otherwise the television maker, who would be one of the first entities desiring to apply this further brightening, to make his display brand look better, could do whatever luminance mapping. And this would not only destroy the look of the video creator (who went through all the trouble to make a particularly impressive looking HDR scene image, by positioning all object luminances at desired values in the master grading image, and also specify how to slightly change this distribution when going to lesser dynamic ranges), bringing us back to square one of simple and unpredictable manners of HDR making, coding, handling and displaying. In fact, it might even be expected that at least some end-users would apply quite strong luminance remapping functions, making their images pop out impressively, potentially even in a gaudy tasteless manner according to the creator. But this has a worse effect. Although for simplicity we explained what happens to the darkest luminances of an image, the luminances all along the range will need to be correctly positioned (see e.g. the steeper slope between the two bumps) to have credible and impressive HDR effects in the image. If one strongly deviates from the desired display adaptation curve, one deteriorates the image so strongly that it becomes more of an SDR image again, instead of an impressive HDR image, without all the nice HDR effects (not even scaled down somewhat to accommodate the lesser dynamic range capability, but just gone or at least severely distorted). The output image may look flashy, and depending on taste which can vary a lot that may also be nice to some customers, but it doesn't look perfect, i.e. it doesn't look as it was created by the grader of the master HDR video.

So one needs to create an alternative display adaptation function F_ALT_B, to suit the different taste of an non-creator, e.g. a display manufacturer, in a carefully designed technical manner.

It is advantageous if the method of processing an input image uses as one of the two configurable upper bins contains the 1% brightest pixels in the histogram (hist) of intermediate luminances. This super-bin can advantageously also be ignored as less critical by setting its ci multiplier equal to 0 (see below).

It is advantageous if the method of processing an input image has the booster strength value (BO) determined as a customizable multiplier value (mf) multiplied by a relative boost value (RB) which is normalized between zero and one. This is an easy way for implementers to set a customary strength of the amount of deviation of the original grading, whilst balancing with a general improvement of the first appearance beauty of the ultimately displayed images.

It is advantageous if the of processing an input image has the calculation of the booster strength value done after temporal filtering, to keep a change with a previously determined booster strength value limited, or reduced compared to unfiltered direct changes.

It is advantageous if an asymmetric temporal filtering is used, which filters positive differences differently from negative differences, rapidly changing to lesser booster strength values (because the image may not tolerate much boosting, create errors, and need more careful treatment, immediately) and slower changing to higher booster strength values.

The approach can also be embodied in an image processing apparatus for processing an input image (Im_Comm) of an input video to obtain an output image of an output video, wherein the input image has pixels which have input luminances (Ln_in_pix) which fall within a first luminance dynamic range (DR_1), which first luminance dynamic range has a first maximum luminance (PL_V_HDR), wherein the output image has pixels which have output luminances which can be calculated from the input luminances and which fall within a second luminance dynamic range, which second luminance dynamic range has a second maximum luminance (PL_V_MDR), wherein the apparatus comprises a video data input (227) arranged to receive the input image and a reference luminance mapping function (FL) which is encoded as metadata associated with the input image, wherein the reference luminance mapping function specifies a relationship between luminances of a first reference image and luminances of a second reference image, wherein the first reference image is the input image, wherein the second reference image has a second reference maximum luminance (PL_V_SDR);

wherein the apparatus comprises a display adaptation unit (209) arranged to determine an adapted luminance mapping function (FL_DA) which is based on the reference luminance mapping function (FL), wherein the display adaptation unit uses a pre-fixed display adaptation algorithm, which specifies for each point on a diagonal, in a coordinate system of the input luminances normalized to a maximum being 1 and the output luminances normalized to a maximum being 1, a respective metric along a line segment oriented in a pre-fixed direction, the line segment starting on the diagonal, wherein the respective metric at each position is normalized by giving the point of intersection of the line segment and the locus of the luminance function (FL) in the coordinate system the value 1, wherein the determining locates a position on each respective metric corresponding to the second maximum luminance (PL_V_MDR), wherein the collection of positions on the respective metrics is output as the adapted luminance mapping function (FL_DA);

characterized in that the apparatus comprises a processing comprises a boost determination circuit (700) arranged to calculate a booster strength value (BO) comprising:

a histogram calculation unit (721) arranged to determine a histogram (hist) of intermediate luminances obtained by applying the adapted luminance mapping function (FL_DA) to the input luminances, an average calculation circuit (705) arranged to calculate an average brightness measure (AB) on the basis of the histogram, a first converter unit (706) arranged to calculate a first strength value (PosB) from the average brightness measure (AB), a second measuring unit (711) arranged to calculate a weighted sum (BDE) of pixel counts in at least two configurable upper bins of the histogram, a second conversion unit (712) arranged to calculate a second strength value (NegB) from the weighted sum (BDE), wherein the boost determination circuit determines the booster strength value (BO) on the basis of a value (DV) which is equal to the first strength value (PosB) minus the second strength value (NegB);

wherein the apparatus is further arranged to:

use the display adaptation unit to calculate an adjusted adapted luminance mapping function (F_ALT_B), wherein the adjusted adapted luminance mapping function is calculated by using the display adaptation algorithm in a setting which outputs the locus of positions equal to the booster strength value on the metric as the adjusted adapted luminance mapping function (F_ALT_B); and the apparatus comprising a color transformer (208) arranged to apply the adjusted adapted luminance mapping function (F_ALT_B) to the input luminances to obtain the output luminances.

The image processing apparatus may comprise in the boost determination circuit (700) a temporal filter (740) arranged to calculate less variable booster strength values.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concepts, and in which dashes are used to indicate that a component is optional, non-dashed components not necessarily being essential. Dashes can also be used for indicating that elements, which are explained to be essential, but hidden in the interior of an object, or for intangible things such as e.g. selections of objects/regions.

In the drawings.

DETAILED DESCRIPTION OF THE EMBODIMENTS

Figure 7:
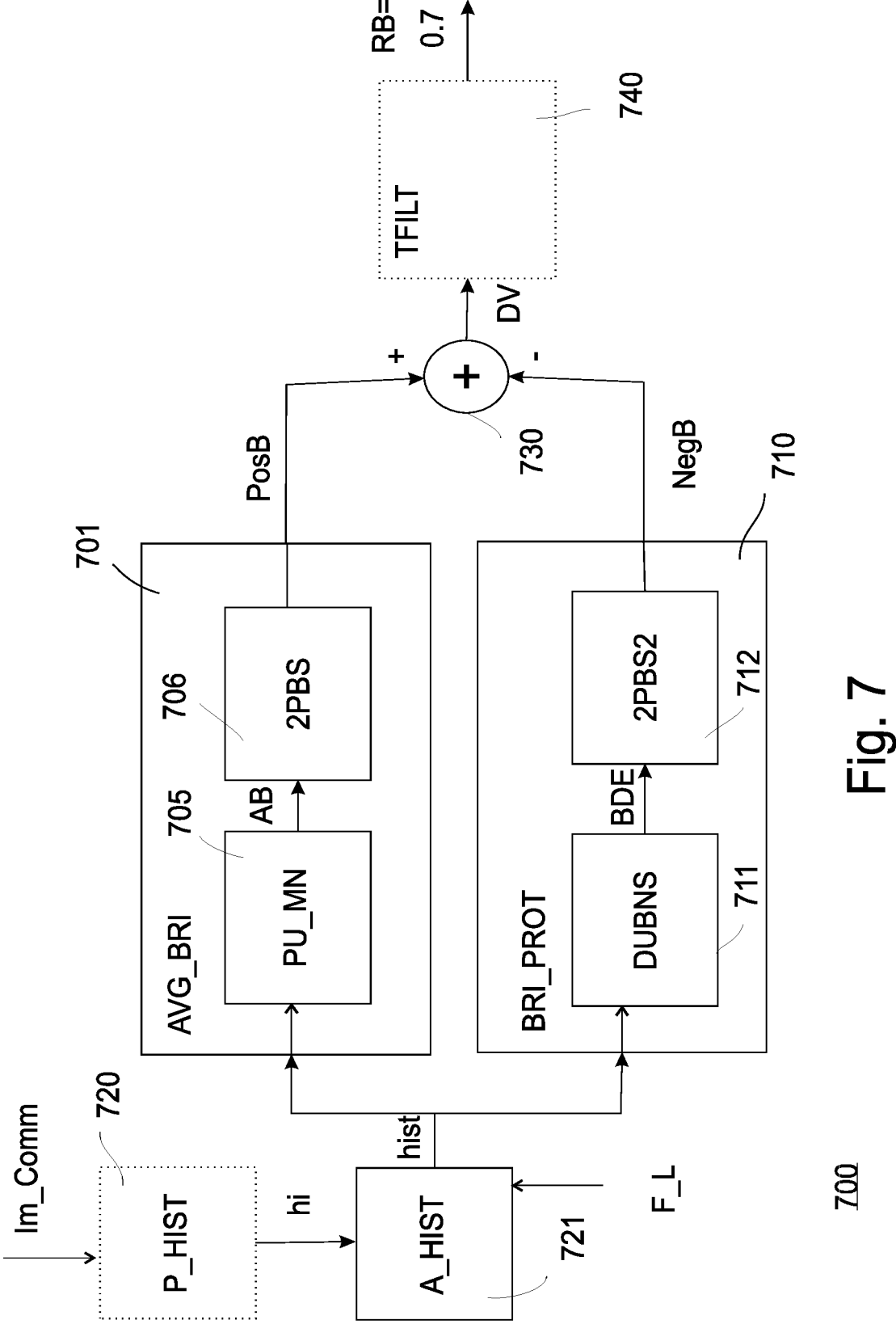
FIG. 7 schematically shows a pragmatically easy to built exemplary embodiment of the present approach, in particular the boost determination circuit (700)

FIG. 7 elucidates aspects of a well-working embodiment of the present approach, and a boost determination circuit 700. Complicated image analysis is expensive in simpler ICs as they occur e.g. in cheaper mobile phones. Also, oftentimes images are so complex that the first insights are relatively easy to obtain, but more detailed insights about the image may need exponentially more analysis calculations before the knowledge of the image becomes deeper. Note also that ideally one does a calculation on the current image being processed, just before doing the final colorimetric transformation, since then a delay of only one image time (i.e. e.g. $\frac{1}{50}^{th}$ of a second) is needed.

What an IC can typically do is determine a histogram of an image. E.g., if an 128 bin histogram is calculated on 1024 luma levels, one has the counts of the amount of pixels in the image on an accuracy of approximately 10 luma units. From such histograms already lots of interesting image information can be obtained to make well-working algorithms. We assume in the present explanation non limitative that the incoming image that was communicated (Im_Comm) is the master HDR per se as it was created at the video creation side, with a downgrading function F_L.

We assume the IC does a first histogram calculation, in first histogram calculation unit 720, e.g. on the input image's native coding, i.e. the coding with which it enters the decoder (we teach this elucidation without intended limitation, as the skilled person can understand how to obtain histograms in other manners). Let's assume this is a PQ luma domain histogram. In fact, we need to have the histogram of the display adapted lumas (reference display adaptation with FL_DA, without the present improvement), since that is the image that is optimized for a particular display, yet still not fully as desired, so it will be measured to see what (semi)automatic improvement is needed. This histogram (hist) will be determined by second histogram calculation unit 721. This unit need not actually apply the display adaptation to the entire image, and then calculate a histogram. It can simply apply the function FL_DA to the histogram (hi) obtained from the first histogram calculation unit 720. The skilled person understands how one can derive histograms in a second domain from histograms in a first domain, e.g. luminance domain or any luma domain defined according to some EOTF. E.g., one can first transform PQ lumas to normalized luminances by applying the Perceptual Quantizer EOTF EOTF_PQ of SMPTE 2084, and thereafter apply a function FL_DA. The counts will then move to different histogram bins. In preferred embodiments, our luminance representation, and hence the histogram his, will be represented in the phychovisually uniformized luma domain according to above Eqs. 3, using as value for PL_V_in the maximum of the image which should be determined, i.e. the PL_D_MDR of the MDR display for which the image should be display adapted, e.g. 700 nit, or 1500 nit, etc.

A brightening promotor unit 701 calculates (in an average calculation circuit 705) a brightness measure of the image (AB), based on some average value of the histogram. There can be various equivalent calculations, but for now we assume it to be the average of the histogram in the perceptually uniformized luma domain, which works nicely in practice.

This value is converted to a strength value, which is ideally normalized between 0 and 1.

Figure 1:
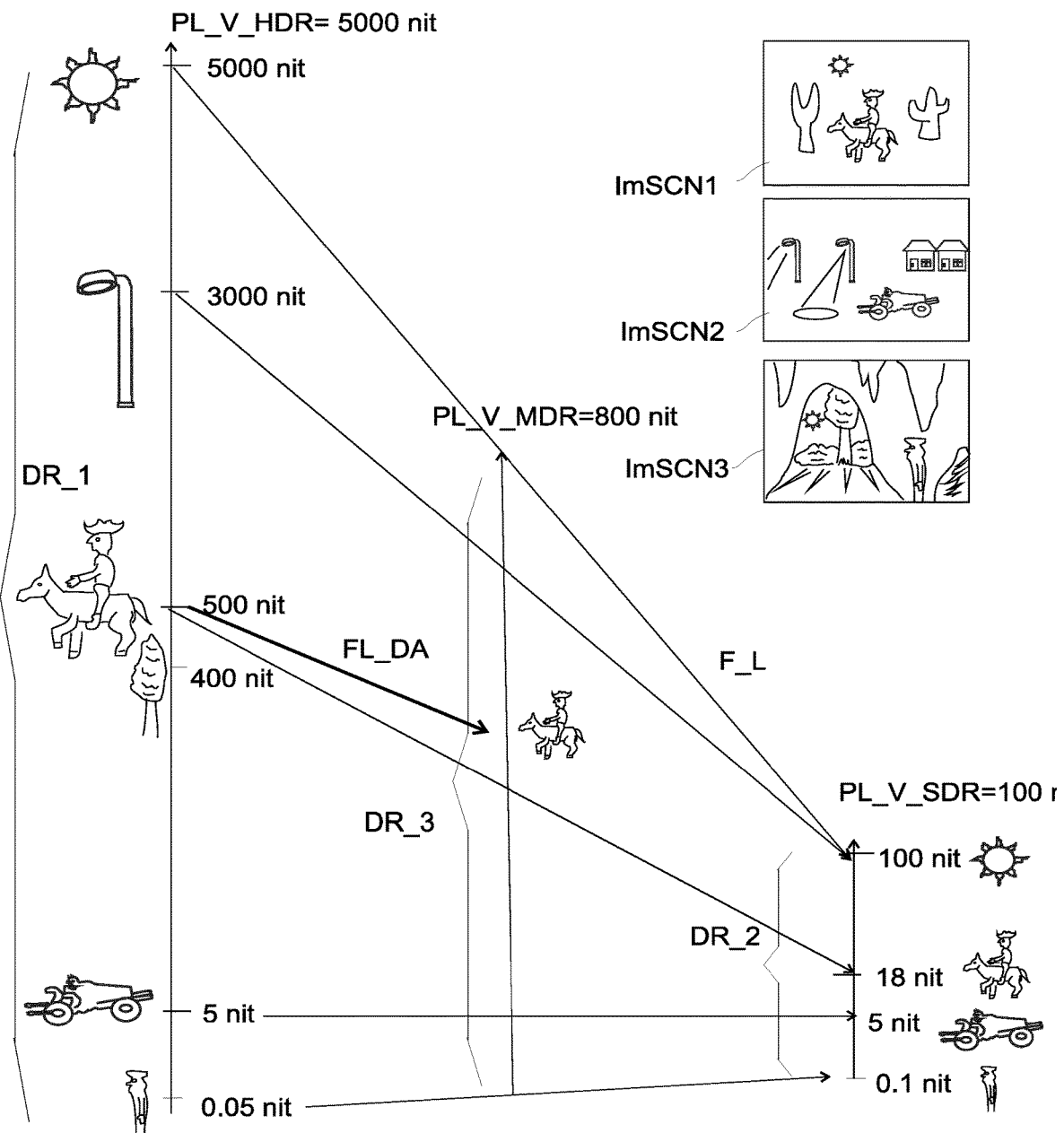
FIG. 1 schematically illustrates a number of typical color transformations which occur when one optimally maps a high dynamic range image to a corresponding optimally color graded and similarly looking (as similar as desired and feasible given the differences in the first and second dynamic ranges DR_1 resp. DR_2) lower dynamic range image, e.g. a standard dynamic range image of 100 nit maximum luminance, which in case of invertibility would also correspond to a mapping of an SDR image as received which actually encodes the HDR scene, to a reconstructed HDR image of that scene. The luminances are shown as locations on vertical axis from the darkest black to the maximum luminance PL_V. A luminance mapping function is symbolically shown by arrows which map average object luminances from their luminances on the first dynamic range to the second dynamic range (the skilled person knows how to equivalently draw this as a classical function, e.g. on normalized-to-1 axis, which are normalized by dividing by the respective maximum luminances)
Figure 2:
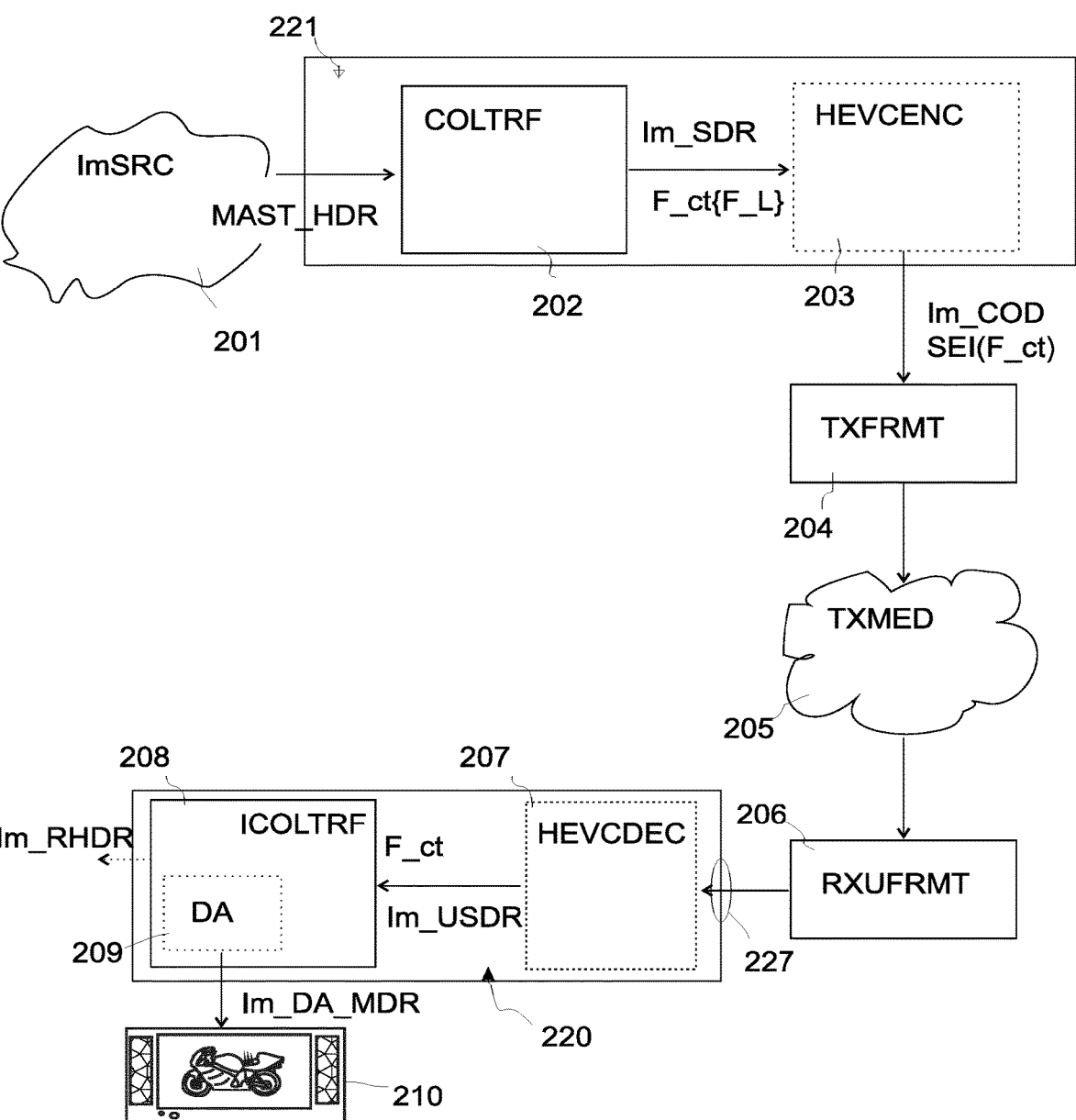
FIG. 2 schematically illustrates an high-level-view example of a technology to encode high dynamic range images, i.e. images capable of having luminances of at least 600 nit typically or more (typically 1000 nit or more), which applicant recently developed, which can actually communicate the HDR image either per se or as a corresponding luminance-regraded SDR image plus metadata encoding color transformation functions comprising at least an appropriate determined luminance mapping function (FL) for the pixel colors, to be used by the decoder to convert the received SDR image(s) into HDR images(s)
Figure 3:
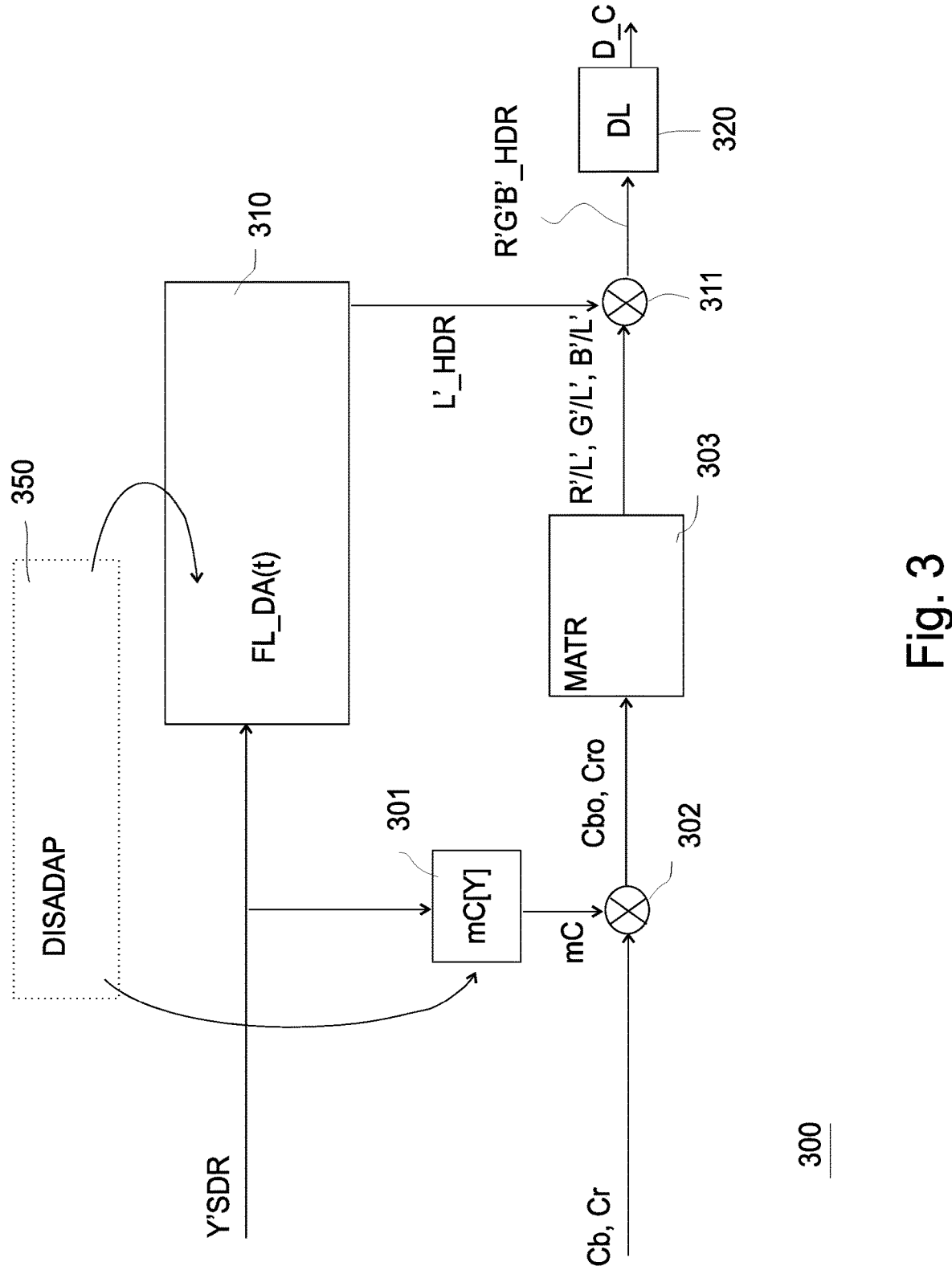
FIG. 3 shows details of the interior of the image decoder, in particular the pixel color processing (transformation) engine, as a (non-limiting) preferred embodiment.
Figure 4:
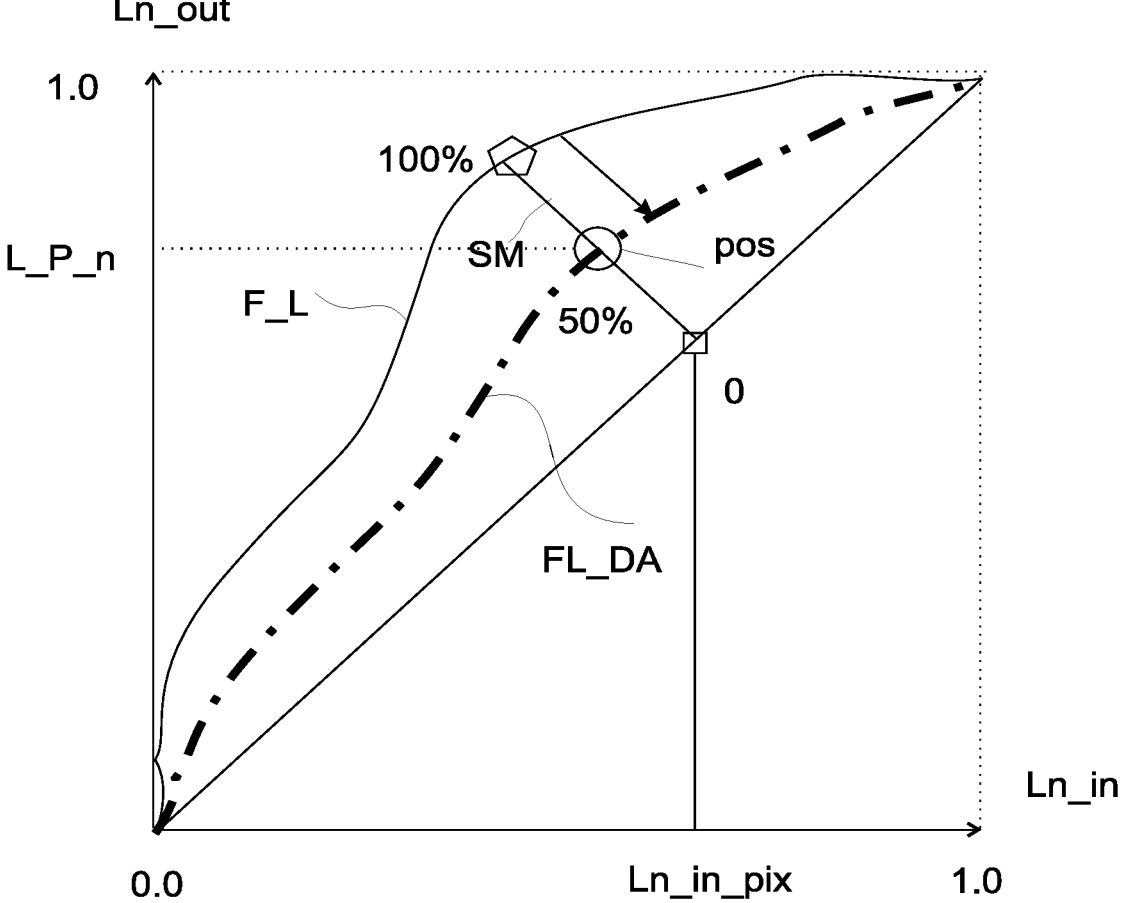
FIG. 4 shows how display adaptation works in a graphical manner, to obtain from a reference luminance mapping function F_L, which codifies the luminance re-grading needs between two reference images, a final display adapted luminance mapping function FL_DA, to be used to calculate the optimal display-adapted version of an input image, for a particular display capability (PL_D)
Figure 5:
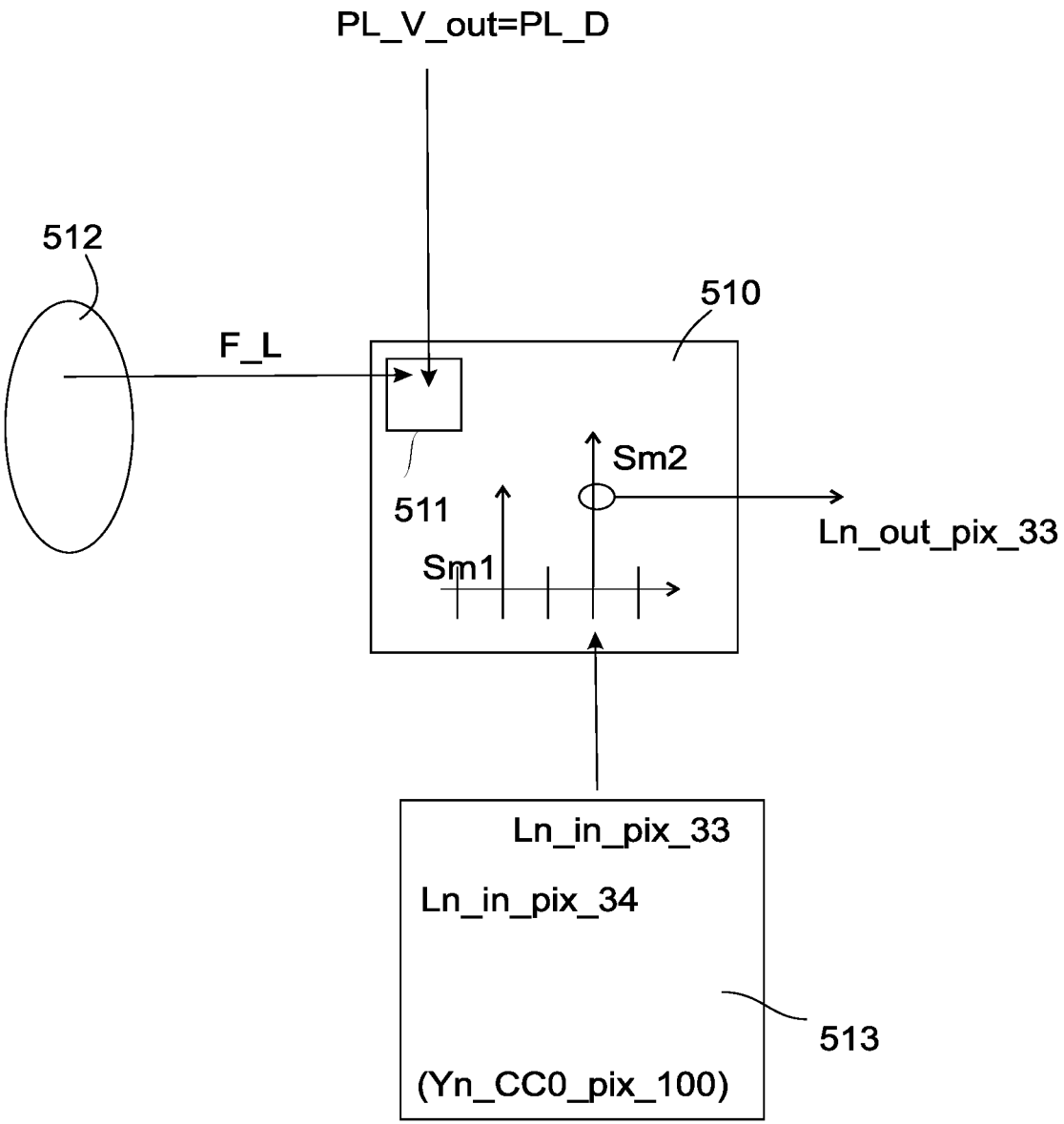
FIG. 5 summarizes the principles of display adaptation more generically, to more readily understand it as a component in the formulation of the present embodiments and claims.
Figure 6:
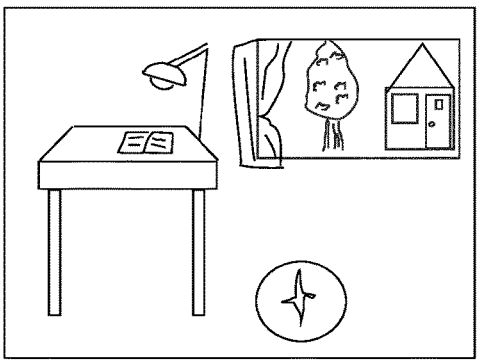
FIG. 6 schematically shows how according to the present insights, one can elegantly formulate further re-grading possibilities in the framework of display adaptation.
Figure 6:
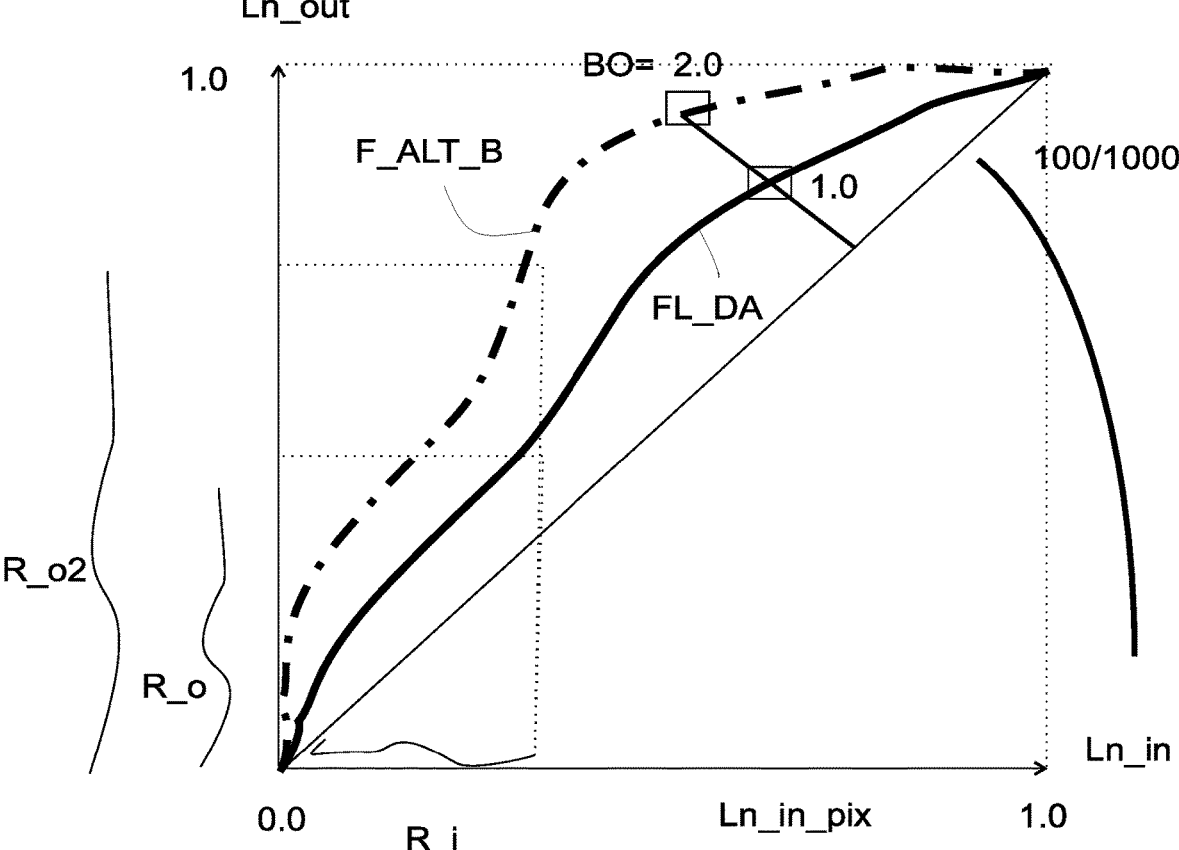

The reader can refer how this works, by looking at FIG. 6. As was taught, one can grade-in a desired look starting from a HDR image input and downgrading (the reader understands that upgrading, e.g. starting from a received SDR image works similarly, though in the other direction, with a concave curve below the diagonal, etc.), to any extent between 0 and 1 needed, on the metric, 1 being the maximal re-grading to obtain the most extreme other reference grading (e.g. the SDR grading). One can now continue this metric, to grade in even more than what was needed. This is not the theoretically optimal grading of the video creator, but it is applying a little more of that useful grading as e.g. the display manufacturer may desire, and at least it follows this prescribed grading. Advanced embodiments can also modify the creator's reference re-grading over only a part of the input luminance range, e.g. only the bottom half gets brightened and blends to the top half staying largely the same or less varied, but we stick with the simpler embodiment for elucidation.

So one can mathematically formulate this extra technical option by extending the metric somewhat (not too much, otherwise the grading gets distorted too much, but a maximum value can be enforced by the developer of the coding framework). Let's assume that one can go to a maximum metric position, which we booster strength value (BO), of 2.0.

It may be advantageous to mark this value as a customizable setting, e.g. by a manufacturer of a display. A good equation is to use a fixed multiplier, for the value which will emerge from boost determination circuit 700, which preferably is a relative boost value (RB) lying between zero and one.

$$\text{So } BO = mf * RB, \text{ with } 1 < mf <= VAL\_Ph, \qquad \text{[Eqs. 5]}$$

VAL_PH is the maximum determined by e.g. the present applicant, e.g. 2.0.

So the reader understand that a metric position needs to be determined, for applying the pre-selected display adaptation algorithm, but now with a metric position outside of 1.0, and this value should be determined suitably on the basis of characteristics of the current image, automatically (or semi-automatically in the sense that the adopter, e.g. a mobile phone manufacturer, can set some control parameters, like e.g. mf).

This should not give any undesirable images, or artefacts neither per image, nor in the totality of the video.

To convert the average brightness measure AB into a positive strength value, first converter unit 706 applies a suitable conversion function.

This function may be designed by the developer of the total HDR handling framework, i.e. e.g. the present patent applicant, but he may leave a few control parameters to allow particular display manufacturers to fine-tune to their own taste.

This function summarizes the desiderata as to when one wants to boost the re-grading, or not boost it and leave it as was (i.e. F_ALT_B stays FL_DA), and to which strength a particular image should be boosted according to the automatic algorithm.

Figure 8:
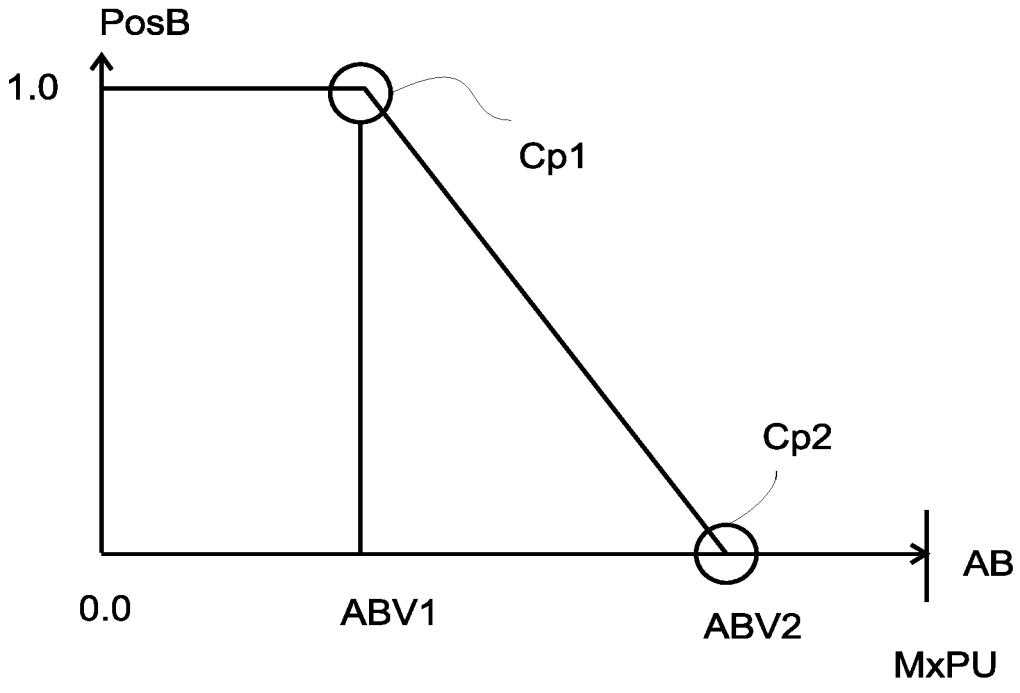
FIG. 8 and FIG. 9 show useful variants of possible respective conversion functions for use in the unit of FIG. 7.

FIG. 8 shows a useful embodiment of such a first conversion function. MxPU may be a typical value predefined over a large set of images, above which one wouldn't do boosting of the display adaptation re-grading (i.e. boosting FL_DA to become F_ALT_B). E.g., if all pixels reside in the upper 10 histogram bins, one has such a bright image already that boosting makes little sense. Actually, in the pragmatic example of FIG. 8, one stops promoting boosting already above control point 2 (Cp2). These control points (also first control point Cp1) can be dragged so that the display manufacturer can tune the behavior of the fixed booster algorithm, but the designer presets them to e.g. 25% of MxPU for Cp1, and 75% for Cp2. So if the average value of the histogram hist is really low (below first value ABV1), one will desire to do maximum boosting, i.e. if the display manufacturer has set mf equal to 2, a value RB of 1 would come out of boost determination circuit 700, and a value BO=2 would be used in the display adaptation algorithm to calculate F_ALT_B. If the image is already somewhat brighter, one would like to use less down-grading, i.e. above ABV1 and up to second value ABV2, the strength of the boosting will go down, or to be precise the value of a (positive/promoting) a first strength value (PosB).

That is because the algorithm is not optimal like this (it would overpromote boosting).

Therefore, the boost determination circuit 700 comprises a boost reduction determination circuit 710. This unit protects the rendering of the brighter regions.

It first calculates a histogram measure again, in second measuring unit 711.

This unit makes a number of (configured) super-bins, i.e. a collection of bins of the histogram hist.

It may make e.g. 2 bins, the upper 1% of the pixels and the upper 5%.

Or it may group the upper 2 bins of the calculated histogram hist into an upper super-bin, and e.g. the 4 bins below into a second super-bin. Etc.

E.g. using 4 super-bins works well.

Then a counting equation is calculated, with suitably set coefficients.

The result DBE equals $sum\{c_i*SB\_i\}$ [Eq. 6] wherein $SB\_i$ is the count of pixels falling in super-bin i, of at least two super-bins, and $c_i$ is the corresponding coefficient. The coefficients can be set at values to value more or less the very brightest pixels e.g., in case one expects e.g. largely dark images, in which the brightest pixels only give the image some sparkle, e.g. metal reflections, or e.g. for sports content one may want a stronger though less colorimetric accurate rendering (so although in general parameters will be set once, to give an averagely well looking result, they could be varied on further aspects such as type of image, television channel being watched, professional versus consumer content, etc.). Typically the ci value for the highest super-bin will be set to zero, measuring the image content in the one or more super-bins below, and the highest super-bin size may then be configured to contain the brightest 1% of pixels. A clipping may be present in the equation, so that extreme values clip to 0, no reducing effect, or 1, or more precisely −1, strong reduction. Further non-linearities could be present, e.g. if DBE=1, there will be no boost even with high promotion PosB, but we elucidate the simpler subtractive countering.

Figure 9:
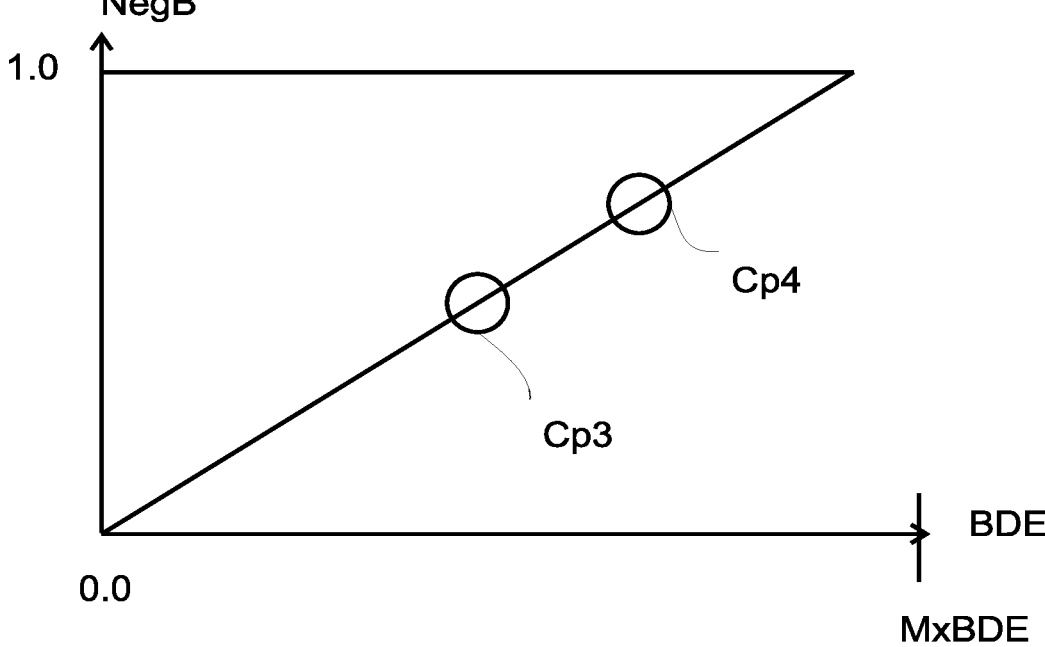

This value is converted in second conversion unit 712 to a (negative/reducing) second strength value (NegB), via a conversion function as e.g. shown in FIG. 9. There can be further control points, third control point Cp3 and $4^{th}$ control point Cp4, to tune different shapes, but in the example we show how an increasing DBE value converts into a increasing normalized NegB value.

Finally NegB is subtracted from PosB by subtractor 730, yielding the final relative boost value RB to be used. Typically the algorithm may decide to clip negative values to zero, meaning no boost, or a metric position of 1.0.

Figure 10:
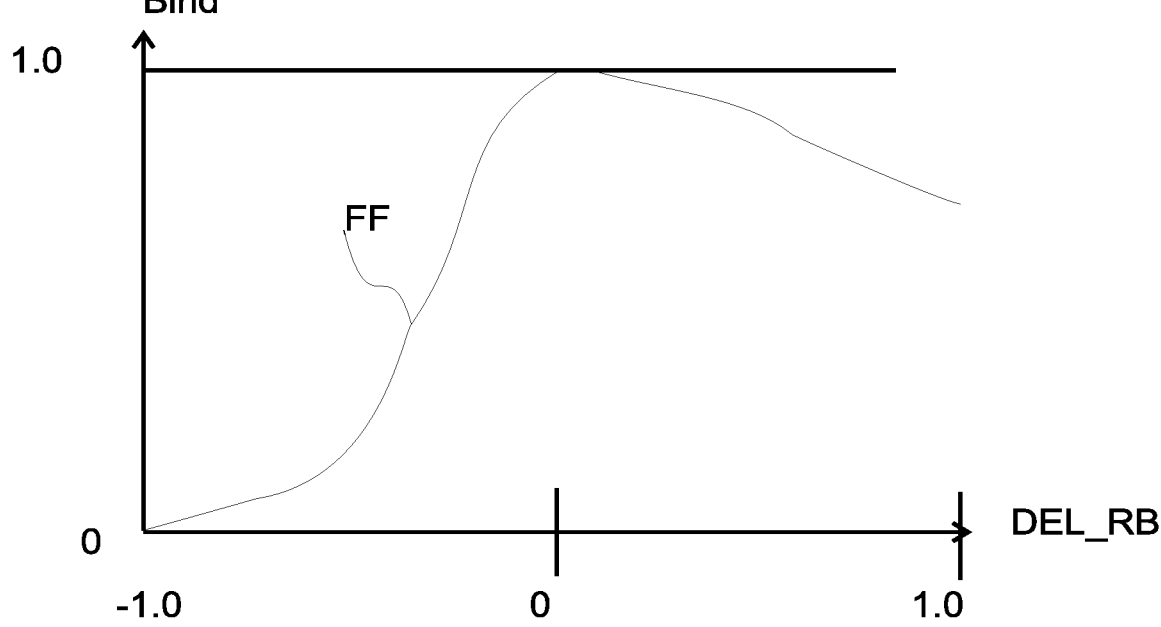
FIG. 10 shows an example of an asymmetric temporal filter for creating more suitable values of the booster strength value (BO).

Since we are dealing with video processing, it may be advantageous to add a temporal filter 740, to filter relative boost values based on the value of previous boost values, or the difference with one or more previous boost values. Then there will be not too much deviation between the boosts of temporally successive video images, which could lead to visible artefacts. This filter will typically have an asymmetric characters as regards increasing versus decreasing needed relative boosts, as is shown in FIG. 10.

An exemplary filtering of the following type is used for illustration (the skilled person understands that equivalent filters can be used).

The difference with the previous (or a combination of several weighted previous) relative boost value RB_tp is calculated:

$$DEL\_RB = DV - RB\_tp; \quad 5$$

A retaining weight (Blnd) is calculated:

Blnd=$FF$($DEL\_PB$), with $FF$ being a filtering function shape.

10

The output relative boost value is calculated as:

$$RB = (1 - Blnd) * DV + Blnd * RB\_tp \quad \text{[Eqs. 7]}$$

15

The algorithmic components disclosed in this text may (entirely or in part) be realized in practice as hardware (e.g. parts of an application specific IC) or as software running on a special digital signal processor, or a generic processor, etc. It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small circuit part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data travelling via a network connection—wired or wireless—, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

24

The invention claimed is:

1. A method comprising:
   obtaining an input image and metadata,
      wherein the input image has pixels which have input luminances,
      wherein the input luminances fall within an input luminance dynamic range,
      wherein the input luminance dynamic range has an input maximum luminance,
      wherein the metadata comprises a reference luminance mapping function,
      wherein the reference luminance mapping function specifies a relationship between luminances of the input image and reference luminances,
      wherein the reference luminances lie in a reference dynamic range,
      wherein the reference dynamic range has a reference maximum luminance;
   determining an adapted luminance mapping function,
      wherein the adapted luminance mapping function is based on the reference luminance mapping function;
   wherein the adapted luminance mapping function is calculated by:
      specifying for each point on a diagonal, a metric along a line segment oriented in a direction,
      wherein the diagonal is set in coordinate system of the input luminances normalized to a maximum of 1 and output luminances normalized to a maximum of 1,
      wherein the line segment has a first endpoint on the diagonal and has a second endpoint at intersection of the line segment and the reference luminance mapping function; and
      locating a position on each metric corresponding to an output maximum luminance;
   determining a histogram of intermediate luminances by applying the adapted luminance mapping function to the input luminances;
   calculating an average brightness measure based on the histogram,
   calculating a first strength from the average brightness measure;
   calculating a weighted sum of pixel counts in at least two brightest bins of the histogram;
   calculating a second strength value from the weighted sum;
   determining a booster strength based on a difference, wherein the difference is the first strength minus the second strength;
   calculating an adjusted adapted luminance mapping function as a locus of positions of the booster strength on the metric; and
   applying the adjusted adapted luminance mapping function on the input luminances so as to obtain output luminances.

2. The method as claimed in claim 1, wherein one of the at least two brightest bins of the histogram comprises the 1% brightest pixels in the histogram.

3. The method as claimed in claim 1, wherein the booster strength is determined as a multiplier multiplied by a relative boost.

4. The method as claimed in claim 1, wherein the calculating of the booster strength is based on temporal filtering so as to limit a change with a previously determined booster strength.

5. The method as claimed in claim 4,
   wherein temporal filtering is asymmetric,
   wherein the temporal filtering is rapidly changing to lesser booster strength, wherein the temporal filtering is slower changing to higher booster strength.

6. An image processing apparatus comprising:

a processor circuit and a memory circuit, wherein the memory circuit is arranged to store at least one instructions for the processor circuit, wherein the processor circuit is arranged to obtain an input image and metadata, wherein the input image has pixels, wherein the pixels have input luminances, wherein the input luminances fall within an input luminance dynamic range, wherein the input luminance dynamic range has an input maximum luminance, wherein the metadata comprises a reference luminance mapping function;

wherein the processor circuit is arranged to determine an adapted luminance mapping function, wherein the adapted luminance mapping function is based on the reference luminance mapping function, wherein the reference luminance mapping function specifies a relationship between luminances of the input image and reference luminances, wherein the reference luminances have a reference maximum luminance, wherein the processor circuit is arranged to specify for each point on a diagonal, a metric along a line segment oriented in a direction, wherein the diagonal is set in coordinate system of the input luminances normalized to a maximum of 1 and output luminances normalized to a maximum of 1, wherein the line segment has a first endpoint on the diagonal and has a second endpoint at an intersection of the line segment and the reference luminance mapping function, wherein the processor circuit is arranged to locate a position on each metric corresponding to an output maximum luminance;

wherein the processor circuit is arranged to calculate a histogram of intermediate luminances by applying the adapted luminance mapping function to the input luminances, wherein the processor circuit is arranged to calculate an average brightness measure on the basis of the histogram, wherein the processor circuit is arranged to calculate a first strength from the average brightness measure, wherein the processor circuit is arranged to calculate a weighted sum of pixel counts in at least two brightest bins of the histogram, wherein the processor circuit is arranged to calculate a second strength value from the weighted sum, wherein the processor circuit is arranged to determine a booster strength based on a difference, wherein the difference is the first strength minus the second strength, wherein the processor circuit is arranged to calculate an adjusted adapted luminance mapping function as a locus of positions of the booster strength on the metric, wherein the processor circuit is arranged to apply the adjusted adapted luminance mapping function to the input luminances so as to obtain the output luminances.

7. A computer program stored on a non-transitory medium, wherein the computer program when executed on a processor performs the method as claimed in claim 1.

8. The apparatus as claimed in claim 6, wherein one of the at least two brightest bins of the histogram comprises the 1% brightest pixels in the histogram.

9. The apparatus as claimed in claim 6, wherein the booster strength is determined as a multiplier multiplied by a relative boost.

10. The apparatus as claimed in claim 6, wherein the calculating of the booster strength is based on temporal filtering so as to limit a change with a previously determined booster strength.

11. The apparatus as claimed in claim 10, wherein temporal filtering is asymmetric, wherein the temporal filtering is rapidly changing to lesser booster strength, wherein the temporal filtering is slower changing to higher booster strength.

* * * * *